(12) United States Patent
Acree et al.

(10) Patent No.: US 6,976,038 B2
(45) Date of Patent: Dec. 13, 2005

(54) METHOD AND APPARATUS FOR REAL TIME CREATION AND MODIFICATION OF A CHANGE LOG FOR MULTI-SERVER SYNCHRONIZATION

(75) Inventors: Richard Kevin Acree, Austin, TX (US); Brian Lee White Eagle, Austin, TX (US); William Harold Gengler, Austin, TX (US); Roy Paterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 10/273,773

(22) Filed: Oct. 17, 2002

(65) Prior Publication Data

US 2004/0078370 A1   Apr. 22, 2004

(51) Int. Cl.[7] .............................................. G06F 12/00
(52) U.S. Cl. ........................................................ 707/203
(58) Field of Search ........................................ 707/203

(56) References Cited

U.S. PATENT DOCUMENTS

| | | | | |
|---|---|---|---|---|
| 5,727,203 A | * | 3/1998 | Hapner et al. | 707/103 R |
| 5,832,508 A | | 11/1998 | Sherman et al. | 707/200 |
| 5,943,675 A | | 8/1999 | Keith et al. | 707/201 |
| 5,987,506 A | * | 11/1999 | Carter et al. | 709/213 |
| 6,067,541 A | | 5/2000 | Raju et al. | 707/3 |
| 6,131,094 A | | 10/2000 | Gord | 707/8 |
| 6,141,664 A | | 10/2000 | Boothby | 707/201 |
| 6,151,607 A | | 11/2000 | Lomet | 707/202 |
| 6,205,449 B1 | * | 3/2001 | Rastogi et al. | 707/202 |
| 6,286,011 B1 | | 9/2001 | Velamuri et al. | 707/104 |
| 6,330,568 B1 | | 12/2001 | Boothby et al. | 707/201 |
| 6,343,299 B1 | | 1/2002 | Huang et al. | 707/203 |
| 6,393,434 B1 | * | 5/2002 | Huang et al. | 707/200 |
| 6,466,951 B1 | * | 10/2002 | Birkler et al. | 707/201 |
| 6,516,314 B1 | * | 2/2003 | Birkler et al. | 707/8 |
| 6,671,757 B1 | * | 12/2003 | Multer et al. | 710/100 |
| 6,847,983 B2 | * | 1/2005 | Somalwar et al. | 707/203 |
| 6,856,993 B1 | * | 2/2005 | Verma et al. | 707/101 |
| 2001/0010075 A1 | | 7/2001 | Tremblay et al. | |
| 2001/0048728 A1 | | 12/2001 | Peng | |
| 2002/0023113 A1 | | 2/2002 | Hsign et al. | |
| 2002/0161735 A1 | * | 10/2002 | Cheng et al. | 707/1 |

OTHER PUBLICATIONS

Nishimoto, "The Log Manager (xLM)", Silicon Graphics Proprietary, Mar. 28, 1994, pp. 1–10.

* cited by examiner

*Primary Examiner*—Wayne Amsbury
(74) *Attorney, Agent, or Firm*—Duke W. Yee; Marilyn Smith Dawkins; Wing Yan Mok

(57) ABSTRACT

A method, apparatus, and computer instructions for synchronizing a database utilized by a client device with a set of servers in which one server has the database. A change log is used with a client database for synchronizing the database. Dirty bits set in the client database are identified and a change log is modified based on the identified dirty bits. This change log is used to synchronize the database on the server with a client database on the client device.

18 Claims, 3 Drawing Sheets

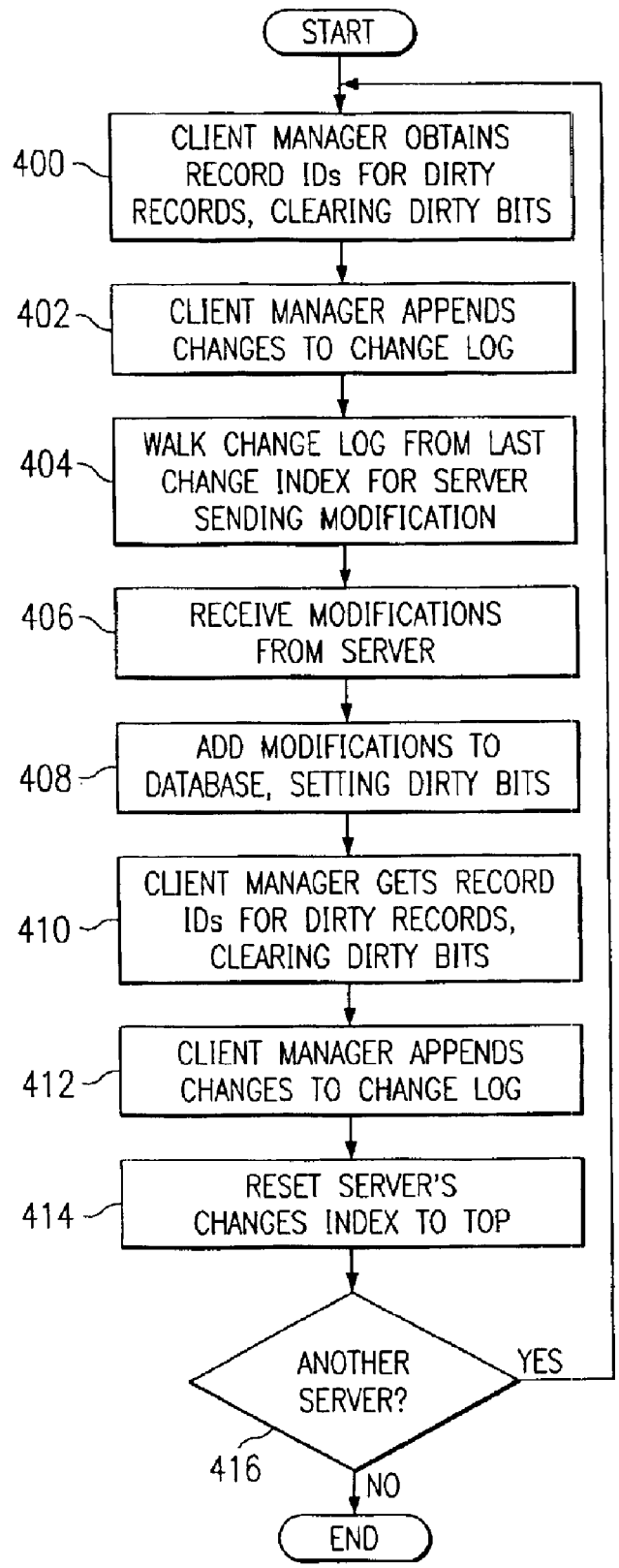

METHOD AND APPARATUS FOR REAL TIME CREATION AND MODIFICATION OF A CHANGE LOG FOR MULTI-SERVER SYNCHRONIZATION

BACKGROUND OF THE INVENTION

1. Technical Field

The present invention relates generally to an improved data processing system, and in particular, to a method and apparatus for synchronizing data. Still more particularly, the present invention provides a method and apparatus for creating a change log to be used in synchronizing data between a single client database and multiple server databases.

2. Description of Related Art

Portable devices, such as personal digital assistants (PDAs) and laptop computers, have become more and more pervasive in everyday use. As microprocessors have become more powerful and storage has become smaller in physical size, PDAs have become more and more popular. A PDA is a handheld computer that serves as an organizer for personal information. A PDA generally includes at least a name and address database, to-do list and note taker. PDAs are pen based and use a stylus to enter selections on menus and to enter printed characters. A PDA also may include a small on-screen keyboard, which is tapped with the pen.

Data may be synchronized between the PDA and desktop computer through a communications link, such as a cable or a wireless link. The databases on these types of devices are also referred to as embedded databases. An embedded database is a database program used on an embedded device, such as a PDA, a cell phone, or some other similar dedicated device. This type of database may be developed from scratch or may be a slimmed down version of a database management system. These embedded devices have limited amounts of memory. The databases are typically synchronized with other devices, such as a desktop data processing system or a server. The synchronization is performed to transfer data to data processing systems with more processing power, storage and capability, as well as to keep data synchronized with other embedded devices.

In many cases, these devices communicate through a low bandwidth connection, such as a wide area wireless connection. In such a case, it is very important to send a minimal amount of data because of the low bandwidth connection. In synchronizing data between multiple databases, minimizing the amount of data sent is even more important in order to reduce the time needed to synchronize a client database in an embedded device with other databases. Therefore, it would be advantageous to have an improved method, apparatus, and computer instructions for synchronizing a database on an embedded device with databases on other servers or computers.

SUMMARY OF THE INVENTION

The present invention provides a method, apparatus, and computer instructions for synchronizing a database utilized by a client device with a set of servers in which one server has the database. A change log is used with a client database for synchronizing the database. Dirty bits set in the client database are identified and a change log is modified based on the identified dirty bits. This change log is used to synchronize the database on the server with a client database on the client device.

As part of the synchronization process, the group of identified dirty bits is cleared and changes are sent to the server having the database in which the changes are from a last change index associated with the server. Afterwards, modifications are received from the server after sending the changes. The modifications received from the server are added to the client database. Another group of dirty bits associated with the modifications is set and the changes are appended to the change log. These changes are based on the modifications.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a process used for synchronizing a client database with another database in accordance with the preferred embodiment of the present invention.

DETAILED DESCRIPTION OF THE PREFERRED EMBODIMENT

Figure 1:
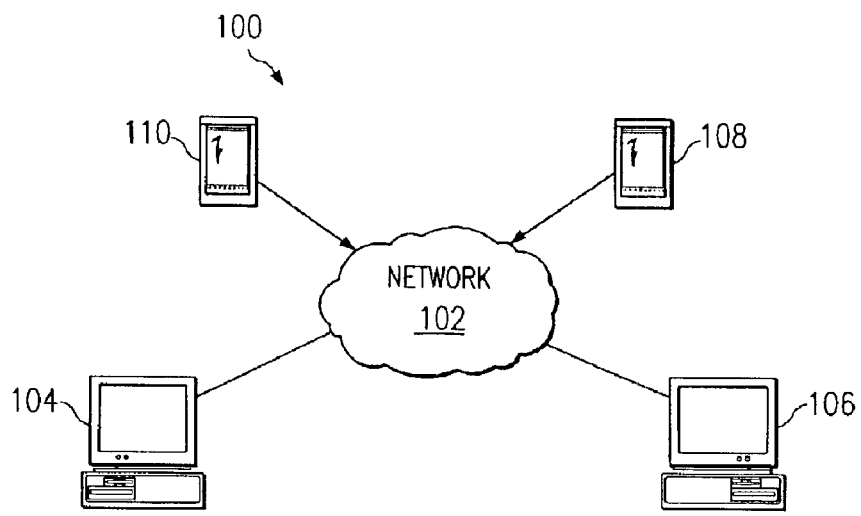
FIG. 1 is a diagram illustrating a network data processing system in accordance with the preferred embodiment of the present invention.

With reference now to the figures, and in particular to FIG. 1, a diagram illustrating a network data processing system is depicted in accordance with a preferred embodiment of the present invention. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

Network 102 provides communications with server 104, server 106, PDA 108, and PDA 110. In these examples, PDA 108 and PDA 110 contain databases, which may be synchronized with databases on servers 104 and 106. The synchronization process may occur through a connection to network 102, which may take various forms. For example, network 102 may be as simple as a set of wires directly connecting the PDAs to the servers or a wireless connection. Network 102 may take a more complex form, such as a local or wide area network to which PDA 108 and PDA 110 establish a connection to synchronize their databases with databases located on servers 104 or 106. The databases on PDAs 108 and 110 may synchronize with a single database or multiple databases depending on the particular implementation. These databases may be located on a single server or on multiple servers.

The present invention provides an improved method, apparatus, and computer instructions for synchronizing a database on an embedded device, such as PDA 108, with a database, such as one located on server 104. The mechanism of the present invention uses a local unique identifier (LUID), which is currently used in databases. A LUID is a non-zero number that uniquely identifies a given database record. In these examples, the LUID may be a time stamp of when a record was created. The mechanism of the present invention uses a selected value for the LUID to indicate that the record has been deleted. In this manner, no additional fields or change logs are required.

Figure 2:
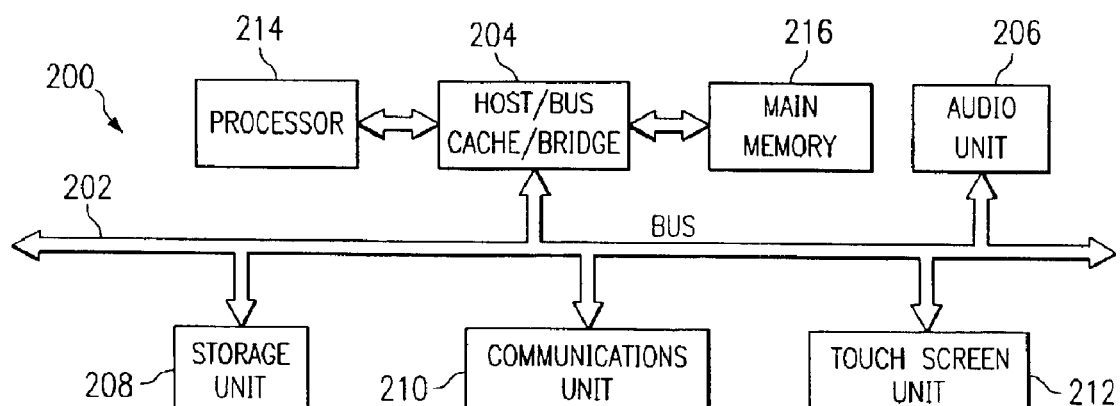
FIG. 2 is a block diagram of a data processing system in which the present invention may be implemented.

With reference now to FIG. 2, a block diagram of a data processing system is shown in which the present invention may be implemented. PDA 200 is an example of an embedded device, such as PDA 108 in FIG. 1, in which code or instructions implementing the processes of the present invention may be located.

PDA 200 includes a bus system, which provides an interconnect for host/bus cache bridge 204, audio unit 206, storage unit 208, communications unit 210, and touch screen unit 212. Host/bus cache bridge 204 provides a connection for processor 214 and main memory 216.

The processes of the present invention are performed by processor 202 using computer implemented instructions, which may be located in a memory, such as, for example, main memory 216 or storage unit 208. Audio unit 206 provides a mechanism for an audio output, such as presentation of an audio file. Audio unit 206 may be, for example, a speaker and/or an output for a headphone. Storage unit 208 may take various forms, such as, for example, a compact flash or a memory stick. In some cases, storage unit 208 may even take the form of a hard disk drive. Communications unit 210 provides for establishing a communications link with another device, such as, for example, a PDA or a server. Touch screen unit 212 provides a display to present information to a user as well as a mechanism to receive input. In this example, the input is received through the use of a stylus that is tapped on the display mechanism of touch screen unit 212.

A database system is located on PDA 200 and synchronized with one or more servers. The present invention provides an improved method, apparatus, and computer instructions for synchronizing a client database with more than one database. These databases are typically located on different servers. The mechanism of the present invention modifies a change log located in the client device at the time of synchronization by using dirty bits located on the local or client database.

Figure 3:
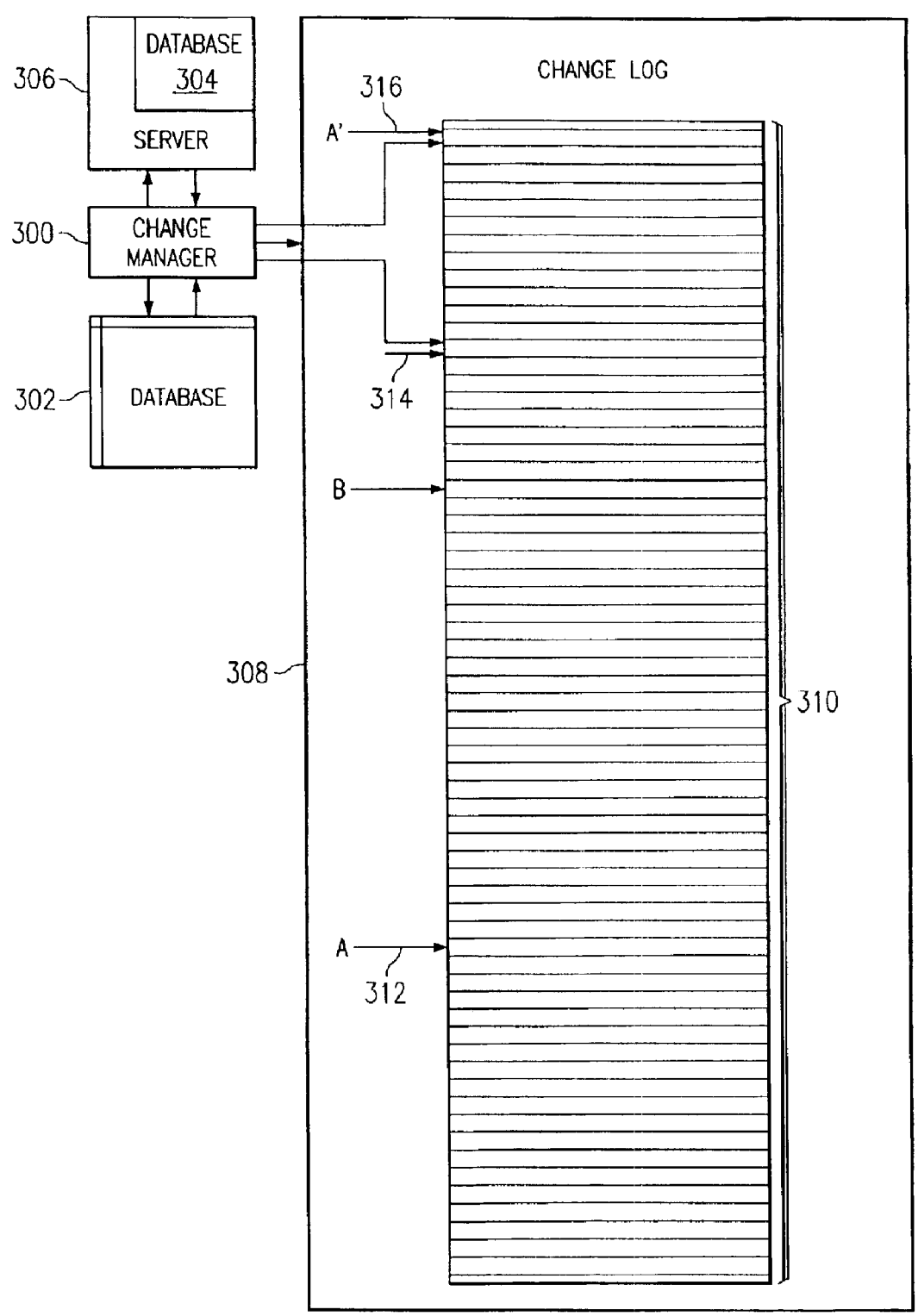
FIG. 3 is a diagram illustrating components used in synchronizing a client database to another database in accordance with the preferred embodiment of the present invention.

With reference now to FIG. 3, a diagram illustrating components used in synchronizing a client database to another database is depicted in accordance with a preferred embodiment of the present invention. In this example, change manager 300 is part of a database management system located on a client, such as PDA 200 in FIG. 2. Change manager 300 provides a mechanism for synchronizing data located within database 302 with database 304 at server 306. Change manager 300 accesses change log 308 identifying changes that are to be synchronized with database 304 on server 306. Additionally, change manager 300 reads and writes entries to database 302 and manages change log 308.

Database 302 is in essence a local data store and includes in these examples application programming interfaces used to clear dirty bits within the database. Database 302 sets dirty bits in response to any modification of a record within database 302. In these examples, three settable dirty bits are present for each record in database 302. These bits are set based on whether a record has been inserted, modified, or deleted. Records with "deleted" dirty bits are referred to as "soft-deleted" because these records may be undeleted by unsetting the dirty bit.

Change log 308 includes records 310. An entry or record is added to the set of records 310 by change manager 300 based on dirty bits that have been set since the last change log update. In these examples, the records are added to change log 308 in a batch manner. Once the records have been added to records 310 in change log 308, the dirty bits in database 302 are cleared. "Soft-deleted" records will be set to a "hard-deleted" state, removing them from database 302. Change log 308 contains an ordered list of changes that includes indices that correspond to a particular server. The index for a server marks a point within change log 308 that has been sent to the server. These indices serve as anchors that map to a particular server and also are referred to just as "anchors".

In synchronizing database 302 with database 304 on server 306, client manager 300 begins by obtaining record identifiers for dirty records. These identifiers are unique IDs that identify a particular data entry. For example, database 302 may support an application program interface that provides all dirty records. Alternatively, client manager 300 may check each record within database 304 to see if a record is dirty. These dirty records are records for which dirty bits have been set. After these record identifiers have been obtained by client manager 300, the dirty bits are cleared within database 302. Thereafter, client manager 300 appends changes to change log 308. The appending of changes to the change log and the clearing of dirty bits occur atomically in these examples. These changes are added to the beginning of records 310 within change log 308 in these examples. In this example, the last synchronization with database 304 is located at anchor 312. The changes appended by change manager 300 add records from anchor 312 to point 314 in change log 308. These changes are sent to server 306 for synchronization with database 304.

Afterwards, modifications are received from server 306 by change manager 300. These modifications may be, for example, changes made to database 304 since the last synchronization with database 302. These changes also may include reconciliations between differences in records sent to server 306. These modifications are added to database 302 and the records in which changes are made have dirty bits set for these records. Client manager 300 then obtains identifiers for dirty records and clears the dirty bits. These changes are appended to change log 308.

Thereafter, the anchor or index associated with the server is set to the top of change log 308 as shown by anchor 316. This process may be performed for each database with which database 302 is synchronized. Each server will have an anchor associated with the server in change log 308.

Turning now to FIG. 4, a flowchart of a process used for synchronizing a client database with another database is depicted in accordance with a preferred embodiment of the present invention. The process illustrated in FIG. 4 may be implemented in a database management system, such as change manager 300 and database 302 in FIG. 3.

The process begins when the client manager obtains record IDs for dirty records and clears dirty bits (step 400). The client manager appends changes to the change log (step 402). In these examples, steps 400 and 402 occur atomically. The change log is walked from last change index for server sending modifications (step 404). For example, anchor 312 in FIG. A represents the last change index since a client database was synchronized with another database. Point 314 in FIG. 3 is an example of records or changes made since the last synchronization shown by anchor 312. These are the modifications, which are sent to the server. In response, modifications may be received from the server (step 406). Modifications received from the server are added to the database, setting dirty bits for the records affected by the modifications (step 408). The client manager gets record IDs for dirty records and clears dirty bits (step 410). The client manager appends changes to records identified by the dirty bits to the change log (step 412). In these examples, steps 410 and 412 occur atomically.

The server's change index is then reset to the top of the change log (step 414). A determination is made as to whether another server is present (step 416). If another server is absent, the process terminates. Otherwise, the process returns to step 400 as described above. At this point, the process starts over to synchronize the client database with another database located on another server. The process in FIG. 4 may be repeated until the client database has been synchronized with all of its associated servers.

Thus, the present invention provides an improved method, apparatus, and computer instructions for synchronizing a client to multiple databases. The mechanism of the present invention allows for reading the dirty bits and modifying the change log as a synchronization process starts. This feature provides advantages because the change log is only used by the synchronization process. If the database is never synchronized, no unnecessary overhead is added. Further, the mechanism of the present invention reduces the amount of information sent from the client to a server. As opposed to a change log being appended with each database modification when dirty bits are not used, a create followed by some number of modifies will result only in a single change log entry such as "create". Some changes are literally a number of modifies on an existing record between synchronizations which will result in only a single change entry of modified. A create of an entry followed by a number of modifications including no modifications, followed by a delete between synchronizations, will not end up creating a change log entry at all.

Further, the database does not need to have any knowledge of the existence of a change log. Instead, a change manager is used to manage modifications to the change log. The database may manage dirty bits such that applications accessing the database do not need to have any knowledge of the dirty bits. In these examples, an application may be written using standard SQL updates. As a result, there is no need for a special application programming interface to update both the database and the change log.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for synchronizing a database utilized by a client device with a plurality of servers in which one server in the plurality of servers has the database, the method comprising:

utilizing a change log with a client database for synchronizing the database;

identifying dirty bits set in the client database to form a group of identified database modifications, wherein the dirty bits indicate whether a record in the client database has been inserted, modified, or deleted;

modifying the change log based on the group of identified database modifications, wherein the change log is used to synchronize the database;

clearing identified dirty bits;

sending changes to the one server having the database, wherein the changes are appended to the change log starting from a last change index in the change log that is associated with the one server;

receiving modifications from the one server after sending the changes;

adding the modifications received from the one server to the client database, wherein the added data entries are marked using dirty bits;

identifying the dirty bits set in the client database to form another group of identified database modifications and clearing the dirty bits; and modifying the change log based on the another group of identified database modifications to append the identified database modifications to the change log, wherein the change log is used to synchronize the database.

2. The method of claim 1 further comprising:

resetting the last change index associated with the one server to a top of the change log.

3. The method of claim 2 wherein the method is repeated for another server within the plurality of servers in which the another server has another database that is to be synchronized with the client database.

4. The method of claim 1, wherein the change log is modified when synchronization occurs.

5. The method of claim 1, wherein the change log includes a set of records in which the set of records contains records that have changed since a last synchronization.

6. The method of claim 1, wherein the client device is one of a personal digital assistant, personal computer, server, or a cell phone.

7. A method for synchronizing a client database utilized by a client device, the method comprising:

setting a dirty bit in the client database for each modification of a data entry since a last synchronization, wherein a group of dirty bits is set to indicate whether the data entry has been inserted, modified, or deleted;

adding change records to a change log based on the group of dirty bits;

clearing the group of dirty bits after the change records are added to the change log; and updating a server from the change log.

8. A data processing for synchronizing a database utilized by a client device with a plurality of servers in which one server in the plurality of servers has the database, the data processing system comprising:
   a bus system;
   a communications unit connected to the bus system;
   a memory connected to the bus system, wherein the memory includes a set of instructions; and
   a processing unit connected to the bus system, wherein the processing unit executes the set of instructions to utilize a change log with a client database for synchronizing the database; identify dirty bits set in the client database to form a group of identified database modifications, wherein the dirty bits indicate whether a record in the client database has been inserted, modified, or deleted; modify the change log based on the group of identified database modifications in which the change log is used to synchronize the database; clear identified dirty bits; send changes to the one server having the database, wherein the changes are appended to the change log starting from a last change index in the change log that is associated with the one server; receive modifications from the one server after sending the changes; add the modifications received from the one server to the client database, wherein the added data entries are marked using dirty bits; identify the dirty bits set in the client database to form another group of identified database modifications and clearing the dirty bits; and modify the change log based on the another group of identified database modifications to append the identified database modifications to the change log, wherein the change log is used to synchronize the database.

9. A data processing system for synchronizing a client database utilized by a client device, the data processing system comprising:
   a bus system;
   a communications unit connected to the bus system;
   a memory connected to the bus system, wherein the memory includes a set of instructions; and
   a processing unit connected to the bus system, wherein the processing unit executes the set of instructions to set a dirty bit in the client database for each modification of a data entry since a last synchronization in which a group of dirty bits are set to indicate whether the data entry has been inserted, modified, or deleted; add change records to a change log based on the group of dirty bits; clear the group of dirty bits alter the change records are added to the change log; and update a server from the change log.

10. A data processing system for synchronizing a database utilized by a client device with a plurality of servers in which one server in the plurality of servers has the database, the data processing system comprising:
    utilizing means for utilizing a change log with a client database for synchronizing the database;
    identifying means for identifying dirty bits set in the client database to form a group of identified database modifications, wherein the dirty bits indicate whether a record in the client database has been inserted, modified, or deleted;
    modifying means for modifying the change log based on the group of identified database modifications, wherein the change log is used to synchronize the database
    clearing means for clearing identified dirty bits;
    sending means for sending changes to the one server having the database, wherein the changes are appended to the change log starting from a last change index in the change log that is associated with the one server;
    receiving means for receiving modifications from the one server after sending the changes;
    adding means for adding the modifications received from the one server to the client database, wherein the added data entries are marked using dirty bits;
    identifying means for identifying the dirty bits set in the client database to form another group of identified database modifications and clearing means for clearing the dirty bits; and
    modifying means for modifying the change log based on the another group of identified database modifications to append the identified database modifications to the change log, wherein the change log is used to synchronize the database.

11. The data processing system of claim 10 further comprising:
    resetting means for resetting the last change index associated with the one server to a top of the change log.

12. The data processing system of claim 11, wherein the identifying means, modifying means, clearing means, sending means, receiving means, adding means, setting means, appending means, and resetting means are reinitiated for another server within the plurality of servers in which the another server has another database that is to be synchronized with the client database.

13. The data processing system of claim 10, wherein the change log is modified when synchronization occurs.

14. The data processing system of claim 10, wherein the change log includes a set of records in which the set of records contains records that have changed since last synchronization.

15. The data processing system of claim 10, wherein the client device is one of a personal digital assistant, personal computer, server, or a cell phone.

16. A data processing system for synchronizing a client database utilized by a client device, the data processing system comprising:
    setting means for setting a dirty bit in the client database for each modification of a data entry since a last synchronization, wherein a group of dirty bits are set to indicate whether the data entry has been inserted, modified, or deleted;
    adding means for adding change records to a change log based on the group of dirty bits;
    clearing means for clearing the group of dirty bits after the change records are added to the change log; and
    updating means for updating a server from the change log.

17. A computer program product in a computer readable medium for synchronizing a database utilized by a client device with a plurality of servers in which one server in the plurality of servers has the database, the computer program product comprising:
    first instructions for utilizing a change log with a client database for synchronizing the database;
    second instructions for identifying dirty bits set in the client database to form a group of identified database modifications, wherein the dirty bits indicate whether a record in the client database has been inserted, modified, or deleted;
    third instructions for modifying the change log based on the group of identified database modifications, wherein the change log is used to synchronize the database;

fourth instructions for clearing identified dirty bits;

fifth instructions for sending chances to the one server having the database, wherein the changes are appended to the change log starting from a last change index in the change log that is associated with the one server;

sixth instructions for receiving modifications from the one server after sending the changes;

seventh instructions for adding the modifications received from the one server to the client database, wherein the added data entries are marked using dirty bits;

eighth instructions for identifying the dirty bits set in the client database to form another group of identified database modifications and clearing means for clearing the dirty bits; and ninth instructions for modifying the change log based on the another group of identified database modifications to append the identified database modifications to the change log, wherein the change log is used to synchronize the database.

18. A computer program product in a computer readable medium for synchronizing a client database utilized by a client device, the computer program product comprising:

first instructions for setting a dirty bit in the client database for each modification of a data entry since a last synchronization, wherein a group of dirty bits are set to indicate whether the data entry has been inserted, modified, or deleted;

second instructions for adding change records to a change log based on the group of dirty bits;

third instructions for clearing the group of dirty bits after the change records are added to the change log; and fourth instructions for updating a sewer from the change log.

* * * * *